United States Patent
Stewart et al.

(10) Patent No.: US 6,730,637 B1
(45) Date of Patent: May 4, 2004

(54) REDUCING FLUID LOSS IN A DRILLING FLUID

(75) Inventors: Wayne S. Stewart, Bartlesville, OK (US); Nathan E. Stacy, Bartlesville, OK (US); Kelly B. Fox, Bartlesville, OK (US); Bharat B. Patel, Bartlesville, OK (US); Sam B. Ledbetter, Bartlesville, OK (US); Alvin Evans, Bartlesville, OK (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 0 days.

(21) Appl. No.: 10/310,984

(22) Filed: Dec. 6, 2002

(51) Int. Cl.$^7$ .................................. C09K 7/06
(52) U.S. Cl. ................. 507/125; 507/231; 507/118; 175/72
(58) Field of Search ............................... 507/125, 231, 507/118; 175/72

(56) References Cited

U.S. PATENT DOCUMENTS

| | | | | | |
|---|---|---|---|---|---|
| 3,682,187 | A | * | 8/1972 | Seymour et al. | 137/13 |
| 3,771,599 | A | * | 11/1973 | Buce | 166/295 |
| 3,910,856 | A | * | 10/1975 | Kruka et al. | 524/530 |
| 4,505,827 | A | * | 3/1985 | Rose et al. | 507/228 |
| 5,258,072 | A | * | 11/1993 | Gopalkirshnan et al. | 106/802 |
| 5,536,706 | A | * | 7/1996 | Kallenbach et al. | 507/231 |
| 6,017,854 | A | * | 1/2000 | Van Slyke | 507/118 |
| 6,448,206 | B1 | * | 9/2002 | Griffith et al. | 507/219 |

* cited by examiner

*Primary Examiner*—Philip C. Tucker
(74) *Attorney, Agent, or Firm*—McDermott, Will & Emery

(57) ABSTRACT

This invention relates to a low toxicity drilling mud oil. In some embodiments, the fluid loss characteristic of the drilling mud oil as used in a borehole can be reduced to less than 0.2 ml/30 minutes by adding about 0.05% to about 2.0% by weight of a butadiene-styrene-butadiene (BSB) block copolymer having about 20% by weight or more styrene.

27 Claims, No Drawings

REDUCING FLUID LOSS IN A DRILLING FLUID

FIELD OF THE INVENTION

The invention relates to substantially reducing fluid loss in a low toxicity oil-base drilling mud by adding an effective amount of a conjugated diene-vinylaromatic-conjugated diene block polymer containing about 20% by weight or more styrene to the drilling mud to produce a drilling fluid composition wherein the fluid loss is equal to or less than 0.2 ml/30 minutes according to the standard testing methods referenced herein.

BACKGROUND OF THE INVENTION

Drilling fluids are used in the process of drilling bore holes in subterranean deposits such as gas and oil. The boring is accomplished by well drilling tools and a drilling fluid. Drilling fluids serve to cool and lubricate the drill bits; to carry the cuttings to the surface as the drilling fluid is circulated in and out of the well; to support at least part of the weight of the drilling pipe and drill bit; to provide a hydrostatic pressure head to prevent caving in of the walls of the well bore, to deposit on the surface of the well bore a filter cake which acts as a thin, semi-pervious layer to prevent undue passage therethrough of drilling fluids; and to perform other functions as are well-known in the drilling art. It may be desired that the drilling fluid exhibit a relatively low rate of filtration or fluid loss in addition to having desirable, rheological properties, such as viscosity and gel strength.

The drilling fluid includes an oil component. It is conventional to use diesel oil, but low toxicity synthetic and non-synthetic oils are presently being used in place of diesel oil.

In one aspect, this invention relates to a method for improving the fluid loss in a low toxicity oil based drilling mud oil (LTOBM).

SUMMARY OF THE INVENTION

In general, in one aspect, the invention provides a drilling fluid composition comprising an LTOBM oil. About 0.05% to about 2.0% by weight of the drilling mud oil is a fluid loss agent, which comprises a butadiene-styrene-butadiene block polymer (BSB) block copolymer having about 20% by weight or more styrene. The fluid loss characteristic of the drilling fluid composition is generally equal to or less than 0.2 ml/30 minutes.

The other characteristics of the present invention will become apparent from the further disclosure of the invention, which is given hereinafter.

DETAILED DESCRIPTION OF THE INVENTION

One embodiment of the invention is directed to adding 0.05 to 2.0% by weight of a BSB block copolymer containing about 20% by weight or more styrene to an LTOBM to produce a drilling fluid exhibiting reduced fluid loss equal to or less than 0.2 ml/30 minutes. In another embodiment of the invention, the BSB block copolymer contains about 25% to about 50% by weight styrene.

The BSB block copolymer is a tri-block polymer. The most common tri-block polymers have a poly (vinylaromatic) segment such as styrene at the ends of the molecule, and an elastomeric segment such as a conjugated diene in the center of the block polymer. Examples of such tri-block polymers include styrene-butadiene-styrene (SBS). The BSB tri-block polymer is not a common block copolymer as is SBS because it has poor physical properties in the solid form. However, it has been discovered that such block copolymers enhance the fluid loss property of a drilling fluid when added to an LTOBM.

The "B" segment of the BSB block polymer is a diene polysegment which can be a polymer from conjugated diene monomers having 4–6 carbons atoms per molecule such as 1,3-butadiene, isoprene, 2-ethyl-1,3-butaiene, 2,3-dimethyl-1,3-butadiene and piperylene. The "S" segment of the block copolymer is a monovinyl aromatic polysegment. Examples of such are styrene, α-methylstyrene, p-vinyltoluene, m-vinyltoluene, o-vinyltoluene, 4-ethylstyrene, 3-ethylstyrene, 2-ethylstyrene, 4-tert-butylstyrene and 2,4-dimethylstyrene.

In the context of the present invention, an LTOBM is a mud composition that does not contain carcinogenic components. In some cases, LTOBMs may be selected according to additional considerations for enhanced environmental friendliness. LTOBMs are generally considered safer than those incorporating conventional diesel oils. Examples of LTOBMs include those containing synthetic drilling mud oils such as ESCAID® 110 (Exxon Mobile Corp.), NOVA-PLUS® (from M-1 Drilling Fluids L.L.C.), SARALINE® (Unical Corp), or a non-synthetic oil such as mineral oil.

Drilling fluids may contain additives and conditioning agents, which are important in determining the fluid loss properties of the drilling fluid, as well as inhibiting shale and clay disintegration. As an example, such additives or agents may include modified lignite, polymers, oxidized asphalt, gilsonite, and humates prepared by reacting humic acid with amide or polyalkyl polyamines.

A drilling fluid of the present invention is used in combination with a rotating drill bit to drill a borehole in a subterranean formation. An exemplary drilling method comprises the steps of rotating a drill bit in the borehole and introducing the drilling fluid into the borehole to pick up the drill cuttings and carrying at least a portion of the drill cuttings out of the borehole. The drilling system employed in such method comprises the subterranean formation, the borehole penetrating the subterranean formation, the drill bit suspended in the borehole, and the drill fluid located in the borehole and proximate the drill bit.

The drilling fluid composition of the invention comprises LTOBM as described above and a BSB block polymer as the fluid loss agent. In some embodiments, the composition may include, in any combination, (i) weighting agents such as barite, hematic, calcium carbonate, galena, siderite and mixtures thereof, to adjust the density of the drilling fluid; (ii) an organophilic clay such as hectorite, bentonite and mixtures thereof as a viscosifier and gelling agent; (iii) lime; and (iv) emulsifiers and wetting agents such as surfactants, ionic surfactants such as fatty acids, amines, amides and organic sulphonates and mixtures thereof.

In various examples discussed below, the fluid loss agent is a block copolymer having a BSB architecture. Such polymers can be made using the same anionic polymerization techniques employed to prepare SBS block polymers. Styrene and 1,3-butadiene are dried by passage over activated alumina (Kaiser A-201), and then copolymerized and coupled in a five-stage process using n-butyllithium initiator. Polymerization is conducted under nitrogen in a stirred, jacketed, stainless steel reactor having a capacity of 7.6 liters employing essentially anhydrous reactants and conditions.

The anhydrous mixtures are stirred continuously during the polymerization process. The process is similar to that used to prepare SBS block copolymers as described in U.S. Pat. No. 4,584,346 which is incorporated herein by reference.

The polymerization is carried out in solution in an inert organic hydrocarbon diluent. Suitable hydrocarbon diluents include aliphatic, cycloaliphatic or aromatic hydrocarbons, which are liquid under the reaction conditions and are preferably of 4 to 12 carbon atoms. Examples are isobutane, n-pentane, isooctane, cyclopentane, cyclohexane, cycloheptane, benzene, toluene, the xylenes and others. Mixtures of these solvents may also be employed. Furthermore, the polymerization is carried out in the presence of small amounts of ethers such as tetrahydrofuran (THF), dimethoxyethane, phenyl methyl ether and others, whereby it is possible to influence, in the conventional manner, the rate of polymerization, the configuration of the conjugated diene polymer segment, and the statistical transition between the conjugated diene and styrene segments.

The amount of the initiator employed in the first stage of the process may depend on the desired molecular weight of the polymer. The initiators employed are the conventional monolithium-hydrocarbons of the general formula RLi, where R is an aliphatic, cycloaliphatic, aromatic or mixed aliphatic-4 aromatic hydrocarbon radical, which may be of 1 to about 12 carbon atoms. Examples of the lithium hydrocarbon initiators to be employed according to the invention are methyllithium; ethyllithium; n-, sec- and tert-butyllithium; isopropyllithium; cyclohexyllithium, t-phenyllithium and p-tolyllithium. The monolithium-alkyl compounds where alkyl is of 2 to 6 carbon atoms are preferred, n-butyllithium being particularly preferred.

The polymerization process is a five-stage process. In the first stage, the polymerization is the virtually complete conversion of a conjugated diene monomer to a polymer to form a diene polysegment. The polymerization is carried out in a hydrocarbon diluent in the presence of an initiator. In particular, the reactor is charged with a mixture of cyclohexane and about 0.04 to 0.2 parts by weight per 100 parts of total monomer (phm) of THF preheated to about 50° C., then 30 to 40 phm 1,3-butadiene and 0.01 to 0.025 phm of n-butyllithium initiator (2% by weight solution in cyclohexane) are added, after which an additional amount of cyclohexane is added to flush the lines.

In the second stage of the process, a monovinyl-aromatic compound is polymerized onto the active chain end of the diene polysegment to form polysegment having an active vinyl-aromatic chain end. In particular, after the polymerization to make the butadiene segment, the reactor is charged with 30 to 40 phm styrene to form a styrene polysegment attached to an end of the butadiene segment leaving an active styrene chain end, after which the lines are rinsed with cyclohexane.

In the third stage of the process, a conjugated diene monomer is polymerized onto the active chain end of the monovinyl-aromatic polysegment. In particular, 30 to 40 phm of butadiene is added to the reactor, followed by cyclohexane to flush the lines.

The fourth stage of the process is the chain termination step where water and carbon dioxide are introduced into the reactor to terminate the polymerization.

The fifth and final stage of the process is a stabilization step wherein antioxidants are added to the reactor. The antioxidants used comprise a hindered phenol such as tetrakismethylene(3,5-di-t-butyl-4-hydroxyhydrocinnamate) methane (a commercial brand of this stabilizer is IRGANOX 1010 from Ciba) in addition to an organic phosphite such as trisnonylphenyl phosphite (TNPP, obtained from GE Specialty Chemicals). The antioxidants are incorporated into the polymer by charging equal amounts of a 2% solution of IRGANOX in THF and a 5% solution of TNPP in cyclohexane to the reactor after the addition of the carbon dioxide.

Following the stabilization step, each copolymer solution was flashed at 178°–180° C. to remove a portion of the cyclohexane diluent. Substantially all of the remaining diluent was removed in a vacuum oven by drying at 90° C. for one hour. The resulting polymer was easily crumbled by hand and then dried for an additional hour in a vacuum oven.

The concentration of the block copolymer in the low toxicity drilling mud is in the range of about 0.05% to about 2.0% by weight of the drilling fluid, preferably about 0.075% to about 1.5% by weight of the drilling mud, and more preferably about 0.1% to about 1.0% by weight of the drilling fluid. As an example, it may be desirable to have the styrene content of the block copolymer greater than 25%, and the fluid loss reduced to a level that is equal to or less than 0.2 ml/30 minutes.

EXAMPLE 1

Preparation of Block Copolymer A

Styrene and 1,3-butadiene are dried by passage over activated alumina (Kaiser A-201). A BSB block copolymer containing 26% styrene was prepared by charging a 7.6 liter-reactor with a mixture of about 6.9 lbs of cyclohexane and 0.08 phm of THF preheated to about 50° C., and then adding 37 phm 1,3-butadiene and 0.021 phm n-butyllithium initiator (2% by weight solution in cyclohexane). The butadiene is polymerized in about 0.5 minutes at a peak polymerization temperature of 56.3° C. and at a peak polymerization pressure of 52.7 psig.

After rinsing the feed lines with approximately 3–20 phm cyclohexane, the reactor is charged with 26 phm styrene wherein styrene is polymerized onto the active chain end of the butadiene segment to form a segment having an active styrene chain end. The polymerization time was about 1.5 minutes. The peak polymerization temperature was 66.5° C. and the peak polymerization pressure was 63.7 psig.

The feed lines were rinsed with approximately 3–20 phm cyclohexane, and then 37 phm of 1,3-butadiene were added to the reactor followed by a final rinse of 3–20 phm of cyclohexane. The butadiene was polymerized onto the active chain end of the styrene polysegment. The polymerization time was about 2 minutes. The peak polymerization temperature was 99.3° C. and the peak polymerization pressure was 65.9 psig The polymerization process was terminated with 4.5 ml water and carbon dioxide (180 psig) at a temperature of 91.5° C. and at a pressure of 101.6 psig. The reaction was then stabilized with 14 g of an antioxidant mixture comprising equal amounts of a 2% solution of IRGANOX in THF and a 5% solution of TNPP in cyclohexane. Approximately 20 cc of each solution were added, giving 4 grams of the hindered phenol and 10 grams of the phosphite.

Following the stabilization step, each copolymer solution was flashed at 178°–180° C. to remove a portion of the diluent. Substantially all of the remaining diluent was removed in a vacuum oven by drying at 90° C. for about one hour. The resulting polymer was easily crumbled by hand and then dried for an additional hour in a vacuum oven. The resultant polymer consisted of 74% butadiene and 26% styrene.

EXAMPLE 2

Preparation of Block Copolymer B

Styrene and 1,3-butadiene are dried by passage over activated alumina (Kaiser A-201). A BSB block copolymer containing 30% styrene was prepared by charging a 7.6 liter reactor with a mixture of about 6.9 lbs. of cyclohexane and 0.16 phm of THF preheated to about 50° C., and then adding 35 phm 1,3-butadiene and 0.013 phm n-butyllithium initiator (2% by weight solution in cyclohexane). The butadiene is polymerized in about 0.5 minutes at a peak polymerization temperature of 68.4° C. and at a peak polymerization pressure of 65.9 psig.

After rinsing the feed lines with approximately 3–20 phm cyclohexane, the reactor is charged with 30 phm styrene wherein styrene is polymerized onto the active chain end of the butadiene segment to form a segment having an active styrene chain end. The polymerization time was about one minute. The peak polymerization temperature was 74.8° C. and the peak polymerization pressure was 78.1 psig.

The feed lines were again rinsed with approximately 3–20 phm cyclohexane, and then 35 phm of 1,3-butadiene was added to the reactor. The butadiene was polymerized onto the active chain end of the styrene polysegment. The polymerization time was about one minute. The peak polymerization temperature was 87.2° C. and the peak polymerization pressure was 80.1 psig.

The polymerization process was terminated with 4.5 ml water and carbon dioxide (180 psig) at a temperature of 87.3° C. and at a pressure of 118.4 psig. The reaction was then stabilized with 14 g of antioxidants, as described in Example 1.

Following the stabilization step, each copolymer solution was flashed at 178°–180° C. to remove a portion of the diluent. Substantially all of the remaining diluent was removed in a vacuum oven by drying at 90° C. for one hour. The resulting polymer was easily crumbled by hand and then dried for an additional hour in a vacuum oven. The polymer comprised 70% butadiene and 30% styrene.

EXAMPLES 3–13

Preparation of Block Copolymers C and E to N

Block copolymers C and E to N were made in a manner similar to the procedures set forth in Examples 1 and 2 to form BSB block copolymers. The composition for each copolymer is set forth in Table 1 below.

TABLE 1

| | | Stage 1 | | | Stage 3 |
|---|---|---|---|---|---|
| Example | Block Copolymer | n-Butyl-lithium (phm) | 1,3-But-adiene (phm) | Stage 2 Styrene (phm) | 1,3-But-adiene (phm) |
| 3 | C | 0.043 | 35 | 30 | 35 |
| 4 | E | 0.054 | 30 | 40 | 30 |
| 5 | F | 0.012 | 25 | 50 | 25 |
| 6 | G | 0.022 | 25 | 50 | 25 |
| 7 | H | 0.006 | 25 | 50 | 25 |
| 8 | I | 0.021 | 25 | 50 | 25 |
| 9 | J | 0.107 | 25 | 50 | 25 |
| 10 | K | 0.043 | 25 | 50 | 25 |
| 11 | L | 0.064 | 15 | 70 | 15 |
| 12 | M | 0.013 | 15 | 70 | 15 |
| 13 | N | 0.022 | 13 | 74 | 13 |

EXAMPLE 14

Preparation of Block Copolymer D

Block copolymer D was made in accordance with the teachings set forth in U.S. Pat. No. 4,584,346. The amount of initial styrene was 15 phm, the amount of butadiene was 70 phm, and the amount of final styrene was 15 phm. The amount of n-butyllithium added to stage 1 of the process was 0.054 phm. The resultant block copolymer contained 30% styrene.

EXAMPLE 15

Preparation of the LTOBM

The LTOBM was prepared by mixing 1800 grams of ESCAID 110 (a mineral oil from Exxon Mobil), 60 grams of lime, 30 grams of VG-69 (organophilic clay from M-1 Drilling Fluids, LLC), 60 grams VERSAMUL (basic emulsifier for mud oils from M-1, Drilling Fluids, LLC), 12.5 grams VERSACOAT (emulsifier for oil muds from M-1, Drilling Fluids, LLC), and 951 grams of $CaCl_2$ brine (weighing 10 lbs/gal).

EXAMPLES 16–35

Preparation of Emulsions Containing LTOBM and Block Copolymers A–N

The LTOBM made in accordance with Example 15 was divided into 230 gram samples in pint jars. To each jar, 130 grams of barite was added and mixed for 10 minutes, 2.0 grams of VG-69 was added and mixed for 30 minutes, and then the block copolymer was added and mixed for 10 minutes. With each sample, the jars was capped and rolled 4 hours in an oven at 150° F. (65° C.), cooled to about 90° F. (32° C.) and mixed for 10 minutes. The sample was then rolled for 16 hours in an oven at 200° F. (93° C.), cooled to about 90° F. (32° C.) and mixed for 10 minutes. The sample was then tested for fluid loss at ambient temperature according to the test procedure in "Recommended Practice Standard Procedure for Field Testing Water-Based Drilling Fluids, API RECOMMENDED PRACTICE 13B-1 (RP 13B-1), First Edition, Jun. 1, 1990, Section 3, FILTRATION, Low-Temperature/Low-Pressure Test".

Measurement of the filtration behavior characteristics of a drilling fluid are fundamental to drilling fluid control. These characteristics are affected by the types and quantities of solids in the fluid and their physical and chemical interactions, which are, in turn, affected by temperature and pressure. The test for fluid loss was at low temperature and low pressure. The filter press was a press using nitrogen pressurization.

The filter press consists of a cylindrical chamber having an inside diameter of 76.2 mm and a height of at least 64.0 mm. The chamber is made of a material resistant to strongly alkaline solutions. The filter is 90 mm filter paper and the filter area is 4508±60 $mm^2$. The filter is on a suitable support. The amount of filtrate is measured using a suitable measuring means such as a graduated cylinder. Pressure is applied using nitrogen gas.

In the context of the present invention, fluid loss is defined in accordance with the procedure for API standard test RP 13B-1, which is hereby incorporated by reference. The fluid loss results for each block copolymer A to N tested is shown in Table 2 below as Examples 16–35. The LTOBM containing the BSB fluid loss agent is poured in the cylindrical chamber to ½ inch of the top. The pressure in the chamber is increased using nitrogen gas and adjusted so that the pressure of 100±5 psi is applied in 30 seconds or less. The test period begins at the time of pressure application. At the end of 30 minutes, the volume of filtrate is measured in ml.

TABLE 2

| Example | Block Copolymer | Type | % Styrene | % Copolymer by wt of LTOBM | Fluid Loss (ml/30 minutes) |
|---|---|---|---|---|---|
| 16 | A | BSB | 26% | 0.3% | 0.2 |
| 17 | B | BSB | 30% | 0.3% | 0.1 |
| 18 | C | BSB | 30% | 0.3% | 0.6 |
| 19 |   | BSB | 30% | 0.7% | 0.2 |
| 20 |   | BSB | 30% | 1.4% | 0.2 |
| 21 | D | SBS | 30% | 0.3% | 1.2 |
| 22 | E | BSB | 40% | 0.3% | — |
| 23 |   | BSB | 40% | 0.7% | 0.2 |
| 24 |   | BSB | 40% | 1.4% | — |
| 25 | F | BSB | 50% | 0.3% | 0.8 |
| 26 | G | BSB | 50% | 0.3% | 1.1 |
| 27 | H | BSB | 50% | 0.3% | 1.4 |
| 28 | I | BSB | 50% | 0.3% | 2.0 |
| 29 | J | BSB | 50% | 0.3% | 2.8 |
| 30 | K | BSB | 50% | 0.3% | — |
| 31 |   | BSB | 50% | 0.7% | 0.2 |
| 32 |   | BSB | 50% | 1.4% | 0.2 |
| 33 | L | BSB | 70% | 0.3% | 1.3 |
| 34 | M | BSB | 70% | 0.3% | 3.6 |
| 35 | N | BSB | 74% | 0.3% | 3.6 |

The results shown in Table 2 show that BSB polymers containing 25% to 50% styrene can be effective to reduce fluid loss to a level equal to or less than 0.2 ml/30 minutes. The results further show that as the amount of block copolymer is increased from 0.3% by weight of LTOBM, the fluid loss level can be reduced to a level equal to or less than 0.2 ml/30 minutes. This is shown in Examples 19, 20, 23, 31 and 32. The effective amount of BSB block copolymer is in the range of 0.3 to 1.4% by weight of LTOBM.

Also, a comparison of Example 21, a SBS block copolymer, to Examples 17–20 shows that an SBS having the same styrene content as BSB block copolymer does not provide the fluid loss properties of the BSB polymers of the invention.

While this invention has been described with reference to several preferred embodiments, it is contemplated that various alterations and modifications thereof will become apparent to those skilled in the art upon a reading of the preceding detailed description. It is therefore intended that the following appended claims be interpreted as including all such alterations and modifications as fall within the true spirit and scope of this invention.

What is claimed is:

1. Drilling fluid composition comprising a low toxicity drilling mud oil and about 0.05% to about 2.0% by weight of said drilling mud oil of a fluid loss agent, said agent comprising a butadiene-styrene-butadiene block copolymer having about 20% or more styrene, wherein the fluid loss is equal to or less than 0.2 ml/30 minutes.

2. The drilling fluid composition according to claim 1, wherein the oil is selected from the group consisting of synthetic low toxic oil and mineral oil.

3. The drilling fluid composition according to claim 1, wherein the amount of fluid loss agent in the drilling mud oil is about 0.075% to about 1.5% by weight of said drilling mud oil.

4. The drilling fluid composition according to claim 1, wherein the amount of fluid loss agent in the drilling mud oil is about 0.1% to about 1.0% by weight of said drilling mud oil.

5. The drilling fluid composition according to claim 1, wherein the drilling fluid composition further includes a weighting agent.

6. The drilling fluid composition according to claim 5, wherein the drilling fluid further includes an organophilic clay, lime, a surfactant and an emulsifier.

7. The drilling fluid composition according to claim 6, wherein the drilling fluid further includes asphalt, gilsonite, and modified lignite.

8. The drilling fluid composition according to claim 1, wherein said butadiene-styrene-butadiene block copolymer contains about 25% by weight or more styrene.

9. The drilling fluid composition according to claim 1, wherein said butadiene-styrene-butadiene block copolymer contains about 25% to about 50% by weight styrene.

10. A method of drilling in a subterranean formation, the method comprising the steps of rotating a drill bit in a borehole, and introducing in said drill hole a drilling fluid composition comprising a low toxicity drilling mud oil and about 0.05% to about 2.0% by weight of said drilling mud oil of a fluid loss agent, said agent comprising a butadiene-styrene-butadiene block copolymer having about 20% or more styrene, wherein the fluid loss is equal to or less than 0.2 ml/30 minutes.

11. The method of drilling in a subterranean formation according to claim 10, wherein the oil is selected from the group consisting of synthetic low toxic oil and mineral oil.

12. The method of drilling in a subterranean formation according to claim 10, wherein the amount of fluid loss agent in the drilling mud oil is about 0.075% to about 1.5% by weight of said drilling mud oil.

13. The method of drilling in a subterranean formation according to claim 10, wherein the amount of fluid loss agent in the drilling mud oil is about 0.1% to about 1.0% by weight of said drilling mud oil.

14. The method of drilling in a subterranean formation according to claim 10, wherein the drilling fluid composition further includes a weighting agent.

15. The method of drilling in a subterranean formation according to claim 14, wherein the drilling fluid further includes an organophilic clay, lime, a surfactant and an emulsifier.

16. The method of drilling in a subterranean formation according to claim 15, wherein the drilling fluid further includes asphalt, gilsonite, and modified lignite.

17. The method of drilling in a subterranean formation according to claim 10, wherein said butadiene-styrene-butadiene block copolymer contains about 25% by weight or more styrene.

18. The method of drilling in a subterranean formation according to claim 10, wherein said butadiene-styrene-butadiene block copolymer contains about 25% to about 50% by weight styrene.

19. A drilling system comprising a drill bit suspended in a borehole and a drilling fluid composition located in the borehole and proximate the drill bit, said drilling fluid composition comprising a low toxicity drilling mud oil and about 0.05% to about 2.0% by weight of said drilling mud oil of a fluid loss agent, said agent comprising a butadiene-styrene-butadiene block copolymer having about 20% or more styrene, wherein the fluid loss is equal to or less than 0.2 ml/30 minutes.

20. The drilling system according to claim 19, wherein the oil-base drilling fluid is selected from the group consisting of synthetic low toxic and mineral oil.

21. The drilling system according to claim 19, wherein the amount of fluid loss agent in the drilling mud oil is about 0.075% to about 1.5% by weight of said drilling mud oil.

22. The drilling system according to claim 19, wherein the amount of fluid loss agent in the drilling mud oil is about 0.1% to about 1.0% by weight of said drilling mud oil.

23. The drilling system according to claim 19, wherein the drilling fluid composition further includes an organophilic clay, lime, a surfactant and an emulsifier.

24. The drilling system according to claim 23, wherein the drilling fluid composition further includes a weighting agent.

25. The drilling system according to claim 24, wherein the drilling fluid composition includes asphalt, gilsonite and modified lignite.

26. The drilling system according to claim 19, wherein said butadiene-styrene-butadiene block copolymer contains about 25% by weight or more styrene.

27. The drilling system according to claim 19, wherein said butadiene-styrene-butadiene block copolymer contains about 25% to about 50% by weight styrene.

* * * * *